US010846245B2

(12) United States Patent
Islam et al.

(10) Patent No.: US 10,846,245 B2
(45) Date of Patent: Nov. 24, 2020

(54) MINIMIZING USAGE OF HARDWARE COUNTERS IN TRIGGERED OPERATIONS FOR COLLECTIVE COMMUNICATION

(71) Applicant: Intel Corporation, Santa Clara, CA (US)

(72) Inventors: Nusrat Islam, Bee Cave, TX (US); Gengbin Zheng, Austin, TX (US); Sayantan Sur, Portland, OR (US); Maria Garzaran, Champaign, IL (US); Akhil Langer, Champaign, IL (US)

(73) Assignee: Intel Corporation, Santa Clara, CA (US)

( * ) Notice: Subject to any disclaimer, the term of this patent is extended or adjusted under 35 U.S.C. 154(b) by 50 days.

(21) Appl. No.: 16/353,759

(22) Filed: Mar. 14, 2019

(65) Prior Publication Data
US 2019/0213146 A1 Jul. 11, 2019

(51) Int. Cl.
| | | |
|---|---|---|
| *G06F 16/90* | (2019.01) | |
| *G06F 13/00* | (2006.01) | |
| *G06F 8/00* | (2018.01) | |
| *G06F 13/16* | (2006.01) | |
| *G06F 16/901* | (2019.01) | |

(52) U.S. Cl.
CPC .......... *G06F 13/16* (2013.01); *G06F 8/00* (2013.01); *G06F 16/9024* (2019.01); *G06F 2213/16* (2013.01)

(58) Field of Classification Search
CPC ........ G06F 13/00; G06F 16/9024; G06F 8/00; G06F 2213/16

USPC .......................................................... 710/58
See application file for complete search history.

(56) References Cited

U.S. PATENT DOCUMENTS

| | | | | |
|---|---|---|---|---|
| 9,774,401 | B1 * | 9/2017 | Borrill | H04L 9/0852 |
| 10,382,529 | B2 * | 8/2019 | Wan | H04L 45/02 |
| 10,437,600 | B1 * | 10/2019 | Kohn | G06F 3/0647 |

(Continued)

OTHER PUBLICATIONS

Barrett, et al, "Using Triggered Operations to Offload Rendezvous Messages", EuroMPI 2011, LNCS 6960, pp. 120-129, 2011.

(Continued)

*Primary Examiner* — Christopher B Shin
(74) *Attorney, Agent, or Firm* — Compass IP Law, PC

(57) ABSTRACT

Examples include a computing system having an input/output (I/O) device including a plurality of counters, each counter operating as one of a completion counter and a trigger counter, a processing device; and a memory device. The memory device stores instructions that, in response to execution by the processing device, cause the processing device to represent a plurality of triggered operations of collective communication for high-performance computing executable by the I/O device as a directed acyclic graph stored in the memory device, with triggered operations represented as vertices of the directed acyclic graph and dependencies between triggered operations represented as edges of the directed acyclic graph; traverse the directed acyclic graph using a first process to identify and mark vertices that can share a completion counter; and traverse the directed acyclic graph using a second process to assign a completion counter and a trigger counter for each vertex.

28 Claims, 16 Drawing Sheets

(56) References Cited

U.S. PATENT DOCUMENTS

| | | | | |
|---|---|---|---|---|
| 2002/0144101 | A1* | 10/2002 | Wang | G06F 9/3808 |
| | | | | 712/240 |
| 2007/0234226 | A1* | 10/2007 | Szeto | G06F 3/04842 |
| | | | | 715/769 |
| 2009/0157723 | A1* | 6/2009 | De Peuter | G06Q 10/10 |
| 2010/0073375 | A1* | 3/2010 | Breeds | G06T 17/00 |
| | | | | 345/440 |
| 2011/0219280 | A1* | 9/2011 | Blumrich | G06F 9/46 |
| | | | | 714/748 |
| 2015/0131524 | A1* | 5/2015 | Cavalcante | H04W 24/02 |
| | | | | 370/328 |
| 2019/0042946 | A1* | 2/2019 | Sur | G06N 3/084 |

OTHER PUBLICATIONS

Hemmert, et al, "Using Triggered Operations to Offload Collective Communication Operations", EuroMPI 2010, LNCS 6305, pp. 249-256, 2010.

Riesen, et al, "The Portals 4.0 Message Passing Interface" Prepared by Sandia National Laboratories, SAND2008-2639, Unlimited Release, Apr. 2008.

Sze, et al, "Efficient Processing of Deep Neural Networks: A Tutorial and Survey", IEEE, Aug. 13, 2017.

Underwood, et al, "Enabling Flexible Collective Communication Offload with Triggered Operations," 2011 19th Annual IEEE Symposium on High Performance Interconnects, 2011.

* cited by examiner

402

410

418

500

700

MINIMIZING USAGE OF HARDWARE COUNTERS IN TRIGGERED OPERATIONS FOR COLLECTIVE COMMUNICATION

TECHNICAL FIELD

Examples described herein are generally related to high performance computing (HPC) and more particularly to management of hardware counters using for collective communication operations.

BACKGROUND

Some HPC interconnects include hardware offload solutions for accelerating collective communication operations (typically expressed in Message Passing Interface (MPI) or symmetric hierarchical memory (SHMEM) application programming interfaces (APIs)). Collective communication is a method of communication which involves participation of multiple processes in an HPC system. In a collective communication operation, many processes work together to move data in a specific communication pattern. For example, an "allreduce" operation takes a value from each process, performs an arithmetic operation (e.g., sum) on all the values, and returns the result to every process. An implementation of "allreduce" or other collectives can be expressed as an ordered series of data transfer and atomic operations executed on each process. Some of these operations may be performed by hardware in the HPC system, such as a network interface controller (NIC) or a switch, for example. To implement collection communications, hardware counters are used. To improve HPC system performance, minimizing usage of the hardware counters is desirable.

DETAILED DESCRIPTION

Embodiments of the present invention include a combination of a hardware triggered operation (TO) implementation paired with a host-based software fabric library to ensure high performance triggered operations. In embodiments, both hardware and software are designed and optimized specifically for MPI-style collective communication operations. Improving triggered operation performance results in improved collective communication performance: lower and less varied latency particularly as the number of nodes involved increases. Collective communications are an important part of effectively HPC applications, and performance is a core requirement for customers of HPC network products.

Embodiments of the present invention include a method for minimizing the number of hardware counters used in collective communications that use triggered operations. Triggered operations are used by applications to schedule a network operation to occur in the future, when a trigger counter reaches a specified threshold. Since counters are a scarce resource, it is desirable to use them in an intelligent manner, especially when running in a large supercomputer system or when multiple collectives run concurrently.

Min collective communications are composed of multiple point to point or arithmetic operations. By default, an MPI collective expressed using triggered operations requires a trigger counter and a completion counter for each operation. Embodiments include a process so that each operation in a collective communication does not need to use different trigger and completion counters. Operations can share and re-use counters based on their dependences with others and on topological orderings. Minimizing counter usage is desirable because counters are a limited hardware resource that can restrict the number of concurrent collectives or the scale of the system that can be supported with triggered operations. Minimizing counter usage is also likely to decrease the amount of thrashing in the host fabric interface (HFI) counter cache and thus offers improved application performance.

Embodiments significantly reduce the number of counters needed by a collective using triggered operations, minimize the probability of thrashing the counter cache and hence improve application performance, and are suitable for applications (e.g., Deep Learning (DL) applications) that issue multiple concurrent collectives.

Figure 1:
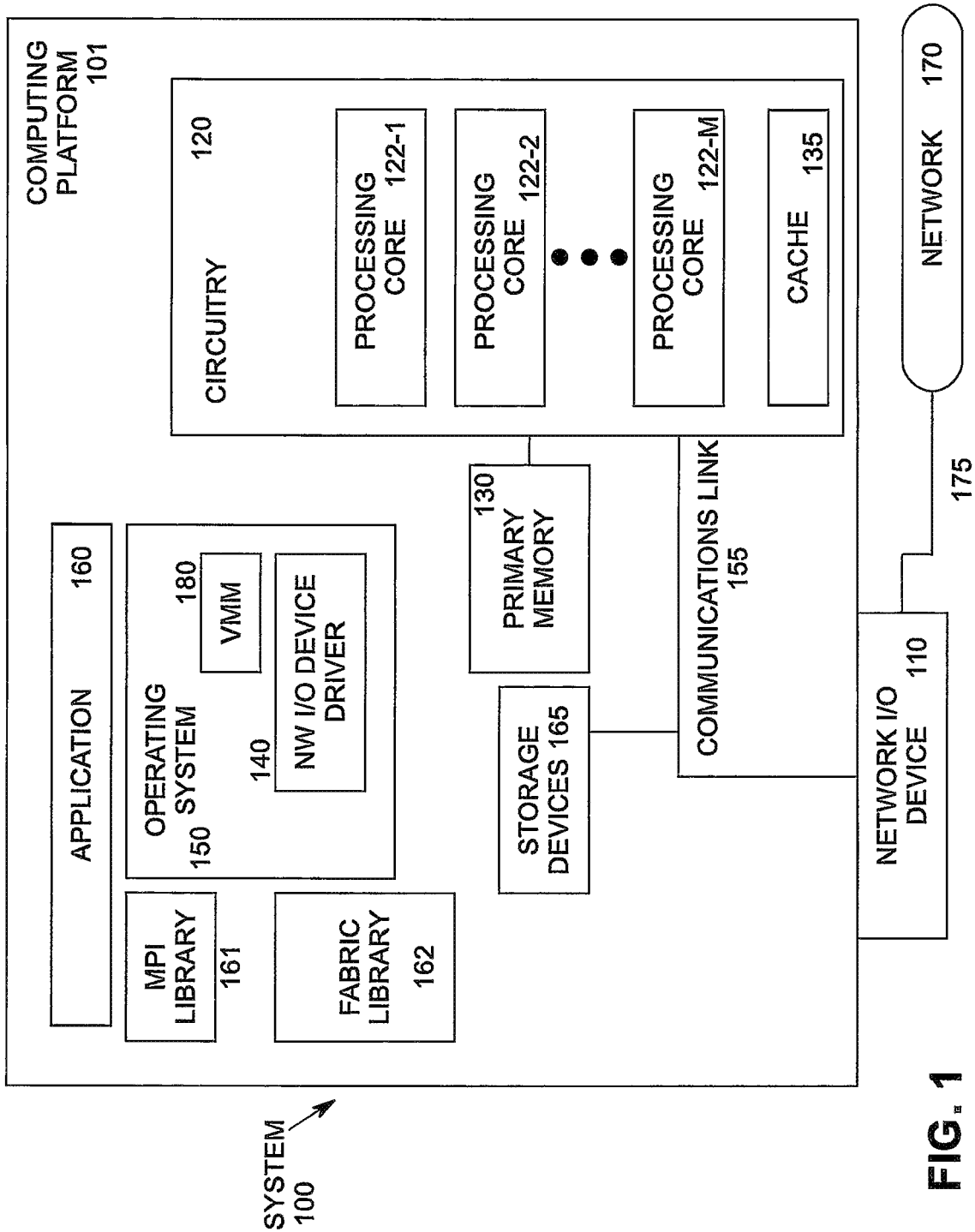
FIG. 1 illustrates an example computing system.

FIG. 1 illustrates an example computing system 100 supporting HPC. As shown in FIG. 1, computing system 100 includes a computing platform 101 coupled to a network 170 (which may be the Internet, for example, or a network within a data center). In some examples, as shown in FIG. 1, computing platform 101 is coupled to network 170 via network communication channel 175 and through at least one network I/O device 110 (e.g., a network interface controller (NIC)) having one or more ports connected or coupled to network communication channel 175. In an embodiment, network I/O device 110 is an Ethernet NIC. Network I/O device 110 transmits data packets from computing platform 101 over network 170 to other destinations and receives data packets from other destinations for forwarding to computing platform 101.

According to some examples, computing platform 101, as shown in FIG. 1, includes circuitry 120, primary memory 130, network (NW) I/O device driver 140, operating system (OS) 150, virtual machine manager (VMM) 180 (also known as a hypervisor), at least one application 160, MPI library 161, fabric library 162 (which includes MPI library 161 in one embodiment), and one or more storage devices 165. In one embodiment, OS 150 is Linux™. In another embodiment, OS 150 is Windows® Server. In an embodiment, application 160 represents one or more application programs executed by circuitry 120. Network I/O device driver 140 operates to initialize and manage I/O requests performed by network I/O device 110. In an embodiment, packets and/or packet metadata transmitted to network I/O device 110 and/or received from network I/O device 110 are stored in one or more of primary memory 130 and/or storage devices 165. In at least one embodiment, storage devices 165 may be one or more of hard disk drives (HDDs) and/or solid-state drives (SSDs). In an embodiment, storage devices 165 may be non-volatile memories (NVMs). In some examples, as shown in FIG. 1, circuitry 120 may communicatively couple to network I/O device 110 via communications link 155. In one embodiment, communications link 155 is a Peripheral Component Interface Express (PCIe) bus conforming to revision 4.0 or other versions of the PCIe standard. In some examples, operating system 150, NW I/O device driver 140, application 160, VMM 180, MPI library 161, and fabric library 162 are implemented, at least in part, via cooperation between one or more memory devices included in primary memory 130 (e.g., volatile or non-volatile memory devices), storage devices 165, and elements of circuitry 120 such as processing cores 122-1 to 122-m, where "m" is any positive whole integer greater than 2. In an embodiment, OS 150, NW I/O device driver 140, VMM 180, application 160, MPI library 161, and fabric library 162 are executed by one or more processing cores 122-1 to 122-m. In other embodiments, there are other endpoint devices coupled to communications link 155 (e.g., PCIe interconnect).

In some examples, computing platform 101, includes but is not limited to a computer server, a HPC server, a server array or server farm, a web server, a network server, an Internet server, a work station, a mini-computer, a main frame computer, a supercomputer, a network appliance, a web appliance, a distributed computing system, multiprocessor systems, processor-based systems, a laptop computer, a tablet computer, a smartphone, or a combination thereof. In one example, computing platform 101 is a disaggregated server. A disaggregated server is a server that breaks up components and resources into subsystems. Disaggregated servers can be adapted to changing storage or compute loads as needed without replacing or disrupting an entire server for an extended period of time. A server could, for example, be broken into modular compute, I/O, power and storage modules that can be shared among other nearby servers.

Circuitry 120 having processing cores 122-1 to 122-m may include various commercially available processors, including without limitation Intel® Atom®, Celeron®, Core (2) Duo®, Core i3, Core i5, Core i7, Itanium®, Pentium®, Xeon® or Xeon Phi® processors, ARM processors, and similar processors. Circuitry 120 may include at least one cache 135 to store data.

According to some examples, primary memory 130 may be composed of one or more memory devices or dies which may include various types of volatile and/or non-volatile memory. Volatile types of memory may include, but are not limited to, dynamic random-access memory (DRAM), static random-access memory (SRAM), thyristor RAM (TRAM) or zero-capacitor RAM (ZRAM). Non-volatile types of memory may include byte or block addressable types of non-volatile memory having a 3-dimensional (3-D) cross-point memory structure that includes chalcogenide phase change material (e.g., chalcogenide glass) hereinafter referred to as "3-D cross-point memory". Non-volatile types of memory may also include other types of byte or block addressable non-volatile memory such as, but not limited to, multi-threshold level NAND flash memory, NOR flash memory, single or multi-level phase change memory (PCM), resistive memory, nanowire memory, ferroelectric transistor random access memory (FeTRAM), magneto-resistive random-access memory (MRAM) that incorporates memristor technology, spin transfer torque MRAM (STT-MRAM), or a combination of any of the above. In another embodiment, primary memory 130 may include one or more hard disk drives within and/or accessible by computing platform 101.

In an embodiment, fabric library 162 provides an API for one or more application(s) 160 to interface directly with network I/O device 110. Application 160 may call one or more functions provided by fabric library 162 to implement collective communications in computing platform 101. Fabric library 162, in at least one embodiment, communicates with network I/O device 110 to manage collective communications operations. In an embodiment, application 160 uses fabric library 162 to manage storage in application space used for collective communications and to assign hardware counters (e.g., trigger counters and completion counters) in network I/O device 110. MPI library 161 provides APIs for MPI functions.

In an embodiment, network I/O device 110 includes a hardware implementation of triggered operations (TOs), trigger counters, and completion counters. TOs allow application 160 to queue a data transfer request that is deferred until at least one specified condition is met. A typical use is to send a message only after receiving all input data. TOs are a means of expressing an ordered series of communication and atomic operations to network I/O device 110 for asynchronous execution. Noise and jitter from OS 150 or application 160 are bypassed, resulting in faster data propagation than SW-based sending and receiving of the data between processes of computing platform 101. This offload of processing to network I/O device hardware 110 is a benefit particularly for non-blocking collectives (e.g., machine learning applications will issue many non-blocking "allreduce" collective operations simultaneously). To achieve good performance, fabric library 162 software is designed to manage and utilize triggered operations efficiently, particularly with regard to a cache (not shown in FIG. 1) included in network I/O device 110 for fast access to triggers. Fabric library 162 provides a mechanism for application 160 to allocate storage for collective communications. In some situations, it may be difficult to determine when allocated storage should be deallocated, and how often to communicate deallocation decisions to application 160. If deallocation decisions are communicated to application 160 too frequently, inefficient HPC system processing may result, thereby negatively impacting processing throughput.

Embodiments of the present invention overcome such difficulties by efficiently managing communications between application 160, fabric library 162 and network I/O device 110.

Figure 2:
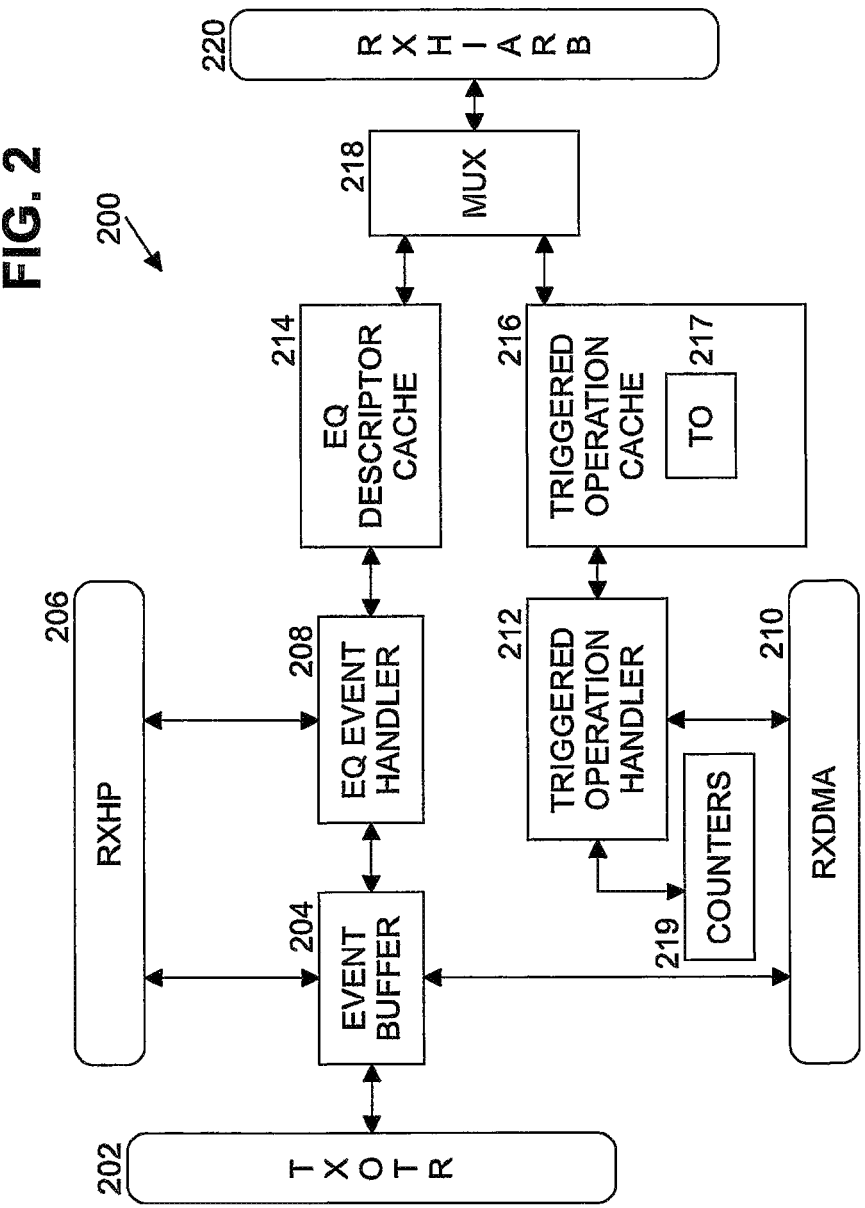
FIG. 2 illustrates a diagram of a portion of an I/O device according to an embodiment.

FIG. 2 illustrates a diagram of a portion of an I/O device 200 according to an embodiment. In an embodiment, I/O device 200 is a portion of network I/O device 110 configured to implement events and triggered operations. Receive host interface arbitration (RxHIArb) 220 is an interface that allows event logic (including event buffer 204, event queue (EQ) event handler 208, and EQ descriptor cache 214) to access host memory (e.g., primary memory 130). RxHIArb 220 is coupled with EQ descriptor cache 214 and a triggered operation cache 216 with 1K entries via multiplexor (MUX) 218. From the perspective of triggered operations, a purpose of RxHIArb 220 is to load TOs 217 into triggered operations cache 216 on a miss or spill items out of triggered operations cache 216 on a capacity eviction. The receive header processing (RxHP) interface 206 connects the event logic to header processing logic (not shown). This enables the header processing logic to provide data about upcoming receive side events to the event logic. The transmit outstanding transactions and reliability (TxOTR) interface 202 is the analogous interface for transmit logic. The receive direct memory access (RxDMA) interface 210 provides information about message completion to the event logic. RxDMA 210 is the block that can determine when a receive side message has actually been written to host memory. RxDMA 210 then retrieves events from the event logic to write to the host and also informs the event logic when counters are incremented.

Event buffer 204 is related to "full events". Event buffer 204 stores information that will be written into host memory when a message completes. Full events are not directly related to triggered operations. EQ event handler 208 manages pointers in the Event Queue (EQ) (which holds full events). EQ descriptor cache 214 holds the pointers (head and tail) for full event queues. EQ descriptor cache 214 also holds information such as the size of those queues and control bits that impact the behavior of those queues.

Triggered operation handler 212 accepts an updated counter from RxDMA 210 and walks the list of triggered operations 217 from triggered operation cache 216. When a triggered operation has a threshold that is met by the new count, the triggered operation is issued. In one embodiment, issuing that triggered operation means passing the triggered operation back to the RxDMA 210. RxDMA 210 has the appropriate interfaces to the transmit logic (not shown) and the receive logic (e.g., RxHP 206) to initiate new operations.

I/O device 200 includes a plurality of counters 219. Counters 219 include a plurality of trigger counters and a plurality of completion counters. The number of counters is fixed according to the design of the I/O device.

Some embodiments may advantageously utilize a Host Fabric Interface (HFI) hardware-based message scheduler in network I/O device 110 to improve or optimize collective operations for application 160. Any suitable hardware-based scheduler technology may be utilized for various embodiments. An example of suitable hardware-based scheduler technology may include technology compatible with the PORTALS Network Programming Interface specification (e.g., version 4.2, released November 2018). For example, some embodiments may utilize a combination of an online messaging profile-based optimization technology and a hardware scheduler's triggered operations (e.g., exposed via an industry standard interface such as OpenFabrics Interface (OFI) developed by the Open Fabrics Alliance). Advantageously, in some embodiments no software agent may be needed, thereby freeing all processors for computation purposes. Additionally, some embodiments may issue messages exactly in the priority order desired, and there is no need to recall any message, thereby decreasing communication latency for applications.

Generally, communication operations are scheduled to be executed by the HFI immediately upon submission by the application. Triggered communication operations allow the application to specify when the operation should be scheduled to execute based on a condition being met, for example, a trigger counter meeting or exceeding a specified threshold value. In an example of a basic technology for a triggered operation, when the value of a trigger counter reaches the specified threshold value, the operation executes. Upon completion of the operation, a separate completion counter may be incremented (e.g., if specified by the application). Triggered operations may be implemented in the HFI by a hardware-based scheduler. An API to access the triggered operations may be exposed via the OFI. Non-limiting examples of triggerable operations include Put (e.g., write), Get (e.g., read), Send, Receive, Atomic, and Counter Increment operations. The triggerable counter increment operation may allow incrementing a counter if another counter is incremented. Such linked counter operation may be particularly useful to allow an application to link multiple disjoint chains of triggered operations.

A triggered operation (TO) (e.g., a deferred data transfer request, triggered counter increment), initially stored in application space in primary memory 130 or storage devices 165 on computing platform 101, includes a communication operation, a triggering counter, and a threshold. A TO is pushed to network I/O device 110 when fabric library 162 adds the TO to the list of pending triggered operations. Network I/O device 110 stores the TO in triggered operation 216 cache and links the TO into an allocated list (described below). Other approaches are possible. In an embodiment, fabric library 162 could write the TO into primary memory 130 and then tell network I/O device 110 to add the TO to the allocated list without pushing the contents of the TO. In an embodiment, the push option is used to further the goal of having the TO cache "never miss". Thus, as long as the TO cache does not run out of capacity, the push approach is better. Unfortunately, multiple user level processes are typically concurrently using the network I/O device in a somewhat uncoordinated way; thus, it is hard for one process to know that another process has already mostly filled the cache (for example).

Counters have a single integer value and are incremented when communication events such as completion of a send operation or a receive operation occur. A TO 'fires' when its counter is equal to or greater than its threshold, initiating the communication operation of the TO by network I/O device 110. In turn, that communication operation upon completion may specify a counter to increment in another TO, which may cause more triggered operations to fire, and so on, forming a chain (or tree) of hardware-implemented triggered communication operations. Once initialized, triggered operations are managed by network I/O device 110, which checks for their threshold condition and fires them asynchronously without software involvement (e.g., without control by application 160 or fabric library 162).

The communication operations offloaded to the Host Fabric Interface (HFI) by an application are, in general, executed immediately. Triggered operations allow the application to specify when the operations should be executed or triggered by using a trigger counter along with a triggering threshold. In order to exploit hardware offloading, each operation in a collective requires two counters: trigger and completion. When the value of the trigger counter reaches the specified threshold, the operation is triggered for execution. In addition, the value of the completion counter is increased by one once the operation is complete.

Figure 3:
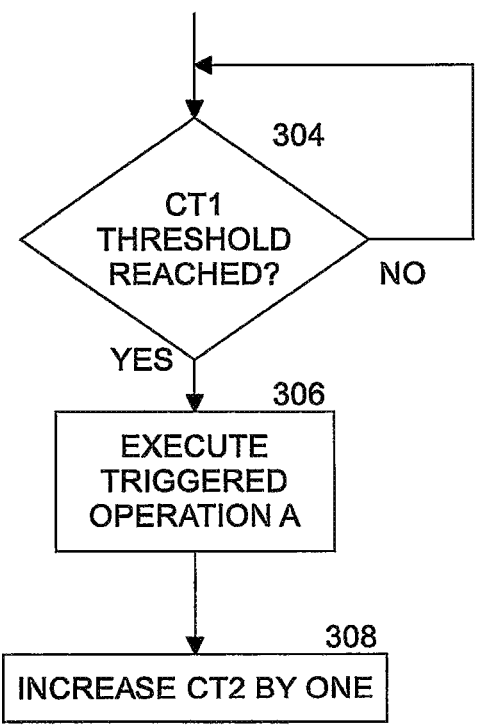
FIG. 3 illustrates an example of execution of a triggered operation.

FIG. 3 illustrates an example 300 of execution of a triggered operation 302 after being offloaded. In this example, triggered operation A 302 includes a trigger counter assigned to counter CT1, a threshold of 2, and a completion counter assigned to counter CT2. At block 304, when counter CT1 reaches the designated threshold, then triggered operation A 302 is executed at block 306, and completion counter CT2 is increased by one at block 308. Otherwise, processing waits and then checks the threshold again.

Triggered operations include Send, Receive, Put, Get, and Counter Increment operations. Triggered operations are implemented in the HFI by network I/O device 110 and can be accessed through application programming interfaces (APIs) provided in an embodiment by MPI library 161). Embodiments include a method to optimize counter usage that re-uses counters among different operations inside a collective by taking into account their dependences and topological ordering. Hardware counters 219 are a limited and scarce resource, so the present method improves on the default mechanism where each operation in a collective is implemented with two counters, which can result in a large number of counters per collective on large systems or when the number of concurrent collectives is large. Also, minimizing the number of counters 219 a collective uses is likely to reduce the amount of thrashing in HFI counter hardware cache 216.

Collective algorithms can be represented in software (e.g., application 160, MPI library 161, and/or fabric library 162) as a dependency graph or Directed Acyclic Graph (DAG) of (triggered) operations, where the dependences among the operations express when an operation o can be triggered based on the completion of the operations o depends on. Each operation is a vertex of the DAG. Dependences between different operations in a collective algorithm can be expressed as a DAG. When the HFI has support for triggered operations, collective algorithms written in terms of triggered operations are offloaded to the HFI (e.g., to network I/O device 110) so that the collective operations can make progress without requiring processor intervention, which is free to perform the computation. This can improve the performance of the overall application by overlapping computation with communication when the collective is non-blocking, in particular.

MPI collectives are being used in a wide variety of fields. Apart from traditional HPC applications, applications from diverse domains like Deep and Machine Learning (DL/ML) also use MPI collectives, like Allreduce during the training phase. Collective algorithms using triggered operations require two counters per operation. But the number of hardware counters 219 in the HFI is limited. In addition, many applications in the Deep Learning and Machine Learning domain launch multiple concurrent non-blocking collectives. Since DL/ML applications can have thousands of layers in the training phase, this can lead to a large number of collectives running at the same time. Consequently, it exceeds the total number of counters available in the hardware 200 and the application 160 has to stall until some counters become available. Further, the use of a large number of counters can cause thrashing on the HFI counter cache 219; as a result, applications can suffer from suboptimal performance. Therefore, it is desirable to discover a method to enable the reuse of hardware counters across different operations of the collective.

Figure 4A:
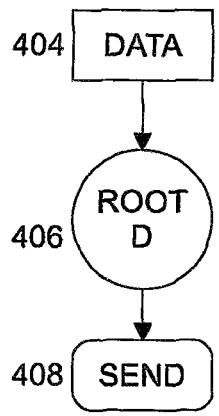
FIGS. 4A, 4B and 4C illustrate examples of a root nodes, intermediate nodes, and leaf nodes.
Figure 4B:
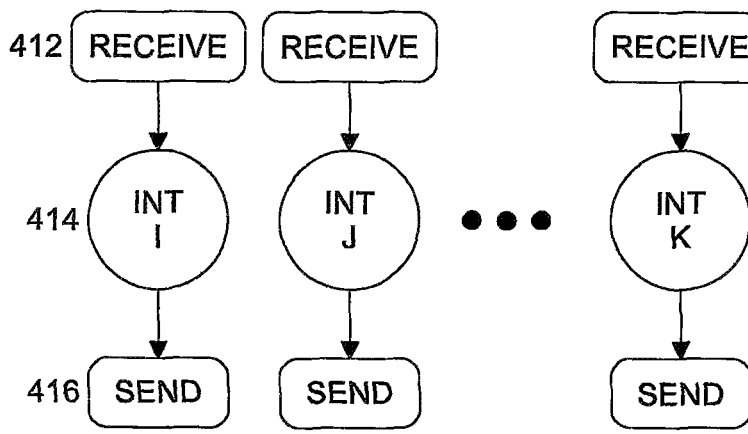
Figure 4C:
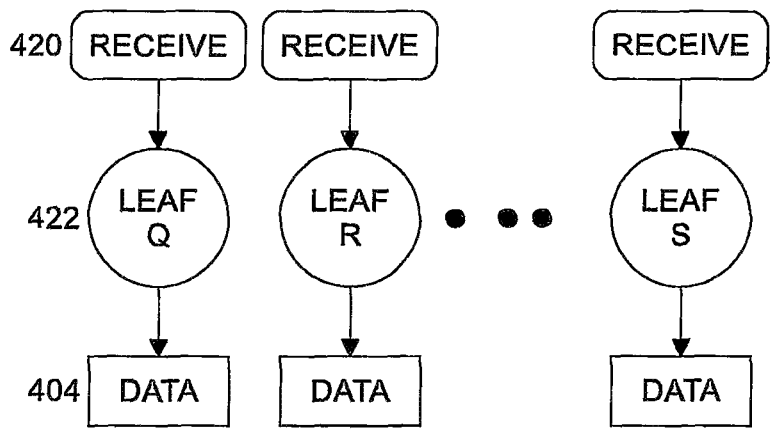

In an embodiment, re-use of counters is based on the dependences among different operations of the collective. The DAGs in FIG. 4 show the dependences and ordering of different operations in an MPI Broadcast. In a tree-based Broadcast, there are three types of processes, root 402, intermediate 410, and leaf 418. Root node 406 (shown in FIG. 4A) starts the Broadcast by sending 408 data 404 to all its children; thus, root nodes have only send operations 408 and these send operations depend only on the availability of the data 404 in the root process. Intermediate nodes 414 (shown in FIG. 4B), on the other hand, receive 412 the data 404 sent from parent nodes (root or another intermediate node) and send 416 the data to all its children. In this case, send operations 416 depend on the completion of receive operations 412 by intermediate nodes 414. Leaf nodes 422 (shown in FIG. 4C) only receive data 404 from their parents and receive operations 420 do not depend on any other operation of that process.

From FIG. 4, it is evident that the completion of the receive operation triggers the send operations in an intermediate node. As a result, the completion counter of the receive operation can serve as the trigger counters for the send operations. Therefore, in an embodiment, instead of creating a new trigger counter for each operation, the dependences among different operations are identified and the completion counters of the parent nodes are reused as trigger counters of the children.

Figure 5:
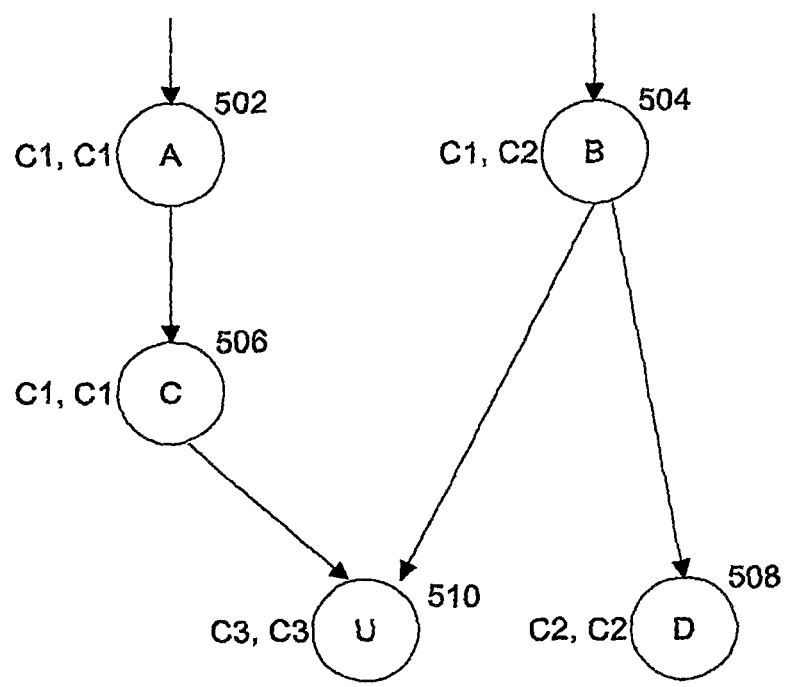
FIG. 5 illustrates an example diagram of a new trigger counter for a vertex according to an embodiment.

Re-using the completion counters of the parent nodes as trigger counters of the child nodes can be challenging, especially in cases where a child operation depends on multiple parents. FIG. 5 illustrates an example diagram 500 of a new trigger counter for a vertex according to an embodiment. The DAG in FIG. 5 shows one such scenario where vertex U 510 depends on two other vertices B 504 and C 506. In known approaches, the dependences on multiple parents (with different completion counters) are implemented by a counter add operation that sums up a certain value to the child node's trigger counter when the parent's completion counter reaches the specified threshold. If Operation C's 506 completion counter C1 is reused as U's 510 trigger counter, the completion of B 504 would trigger a counter add operation to C1 (C1=C1+value) that could trigger Operation C even before Operation A 502 were complete (since C1 is also the trigger counter for Operation C). On the other hand, using Operation B's completion counter C2 as U's trigger counter (C2=C2+value; this happens when Operation C is complete) could trigger Operation D 508 even before Operation B 504 is complete (since C2 is also the triggered counter for Operation D 508). Therefore, to reuse the completion counters of parent nodes for trigger counters of the child nodes, careful attention must be paid about not triggering incorrect operations. Rules are described below to select the appropriate trigger counters in such scenarios.

Notice that re-using completion counters of parent nodes as trigger counters can still utilize a significant number of counters if each operation requires a separate completion counter. However, sharing completion counters is also non-trivial since it can trigger incorrect operations if the operations that share completion counters have different children. Therefore, rules are described below that determine how to share completion counters among operations that have the same set of children.

Embodiments of the present invention include innovative methods for assigning counters 219 to different operations in a collective implemented with triggered operations. For simplicity, it is assumed that the dependence information among the operations of the collective is expressed as a DAG in software, with triggered operations being represented by vertices and the dependencies between triggered operations being represented as edges. The present approach to minimize the hardware counter usage is described below. The approach is general enough for any collective as long as the operation dependences are known.

A set of rules are described for re-using counters across operations and methods that perform counter assignment. In an embodiment, the present approach consists of two parts:

methods for minimizing assignment of completion counters and methods for minimizing assignment of trigger counters.

Some insights into DAGs for triggered operations have been developed. If a vertex v in the DAG has a single parent vertex u, it implies that vertex v is dependent only on vertex u and hence should be triggered on completion of vertex u. So the completion counter of vertex u can be used as the trigger counter of vertex v.

Figure 6:
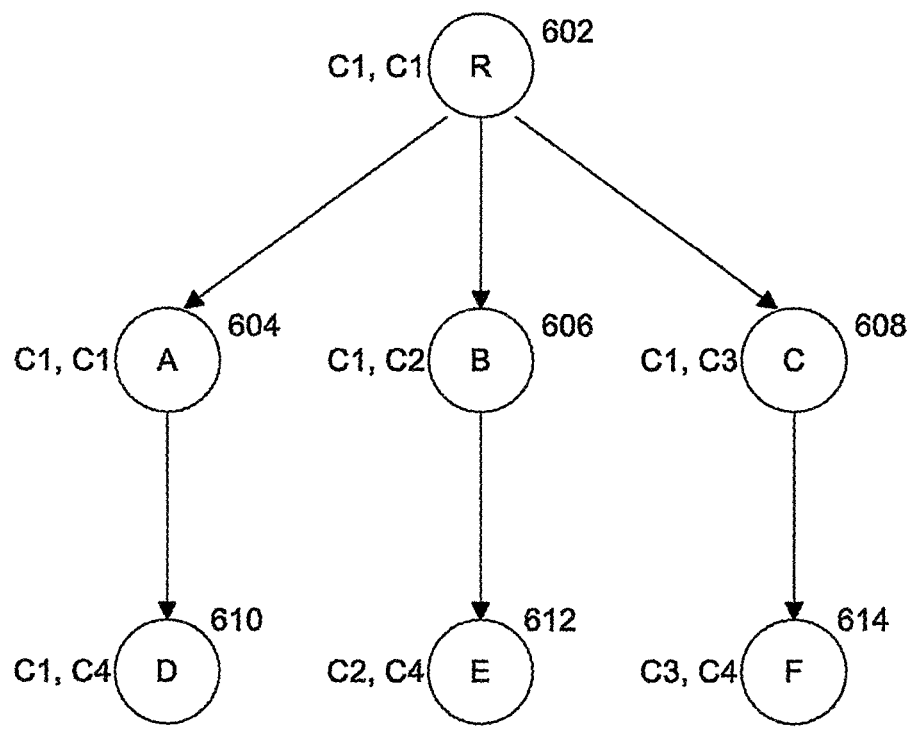
FIG. 6 illustrates an example diagram of a completion counter assignment according to an embodiment.

If multiple operations represented by vertices u and v have the same predecessor vertices o and u and vertex v has no common successors, then vertex o's completion counter can be reused by either vertex u or vertex v as a completion counter, but not both. The reason is that the children vertices of vertex u and vertex v should be triggered upon completion of different events. Hence, different completion counters should be used for vertex u and vertex v. FIG. 6 illustrates an example diagram 600 of a completion counter assignment according to an embodiment. In FIG. 6, vertices a 604, b 606, and c 608 have the same predecessor vertex r 602 but different successor vertices (e.g., child nodes D 610, E 612, F 614, respectively). Vertex a 604 uses its parent's completion counter C1. Therefore, C1 is no longer available for vertices b 606 or c 608, that have to use different completion counters, C2 and C3, respectively.

Figure 7:
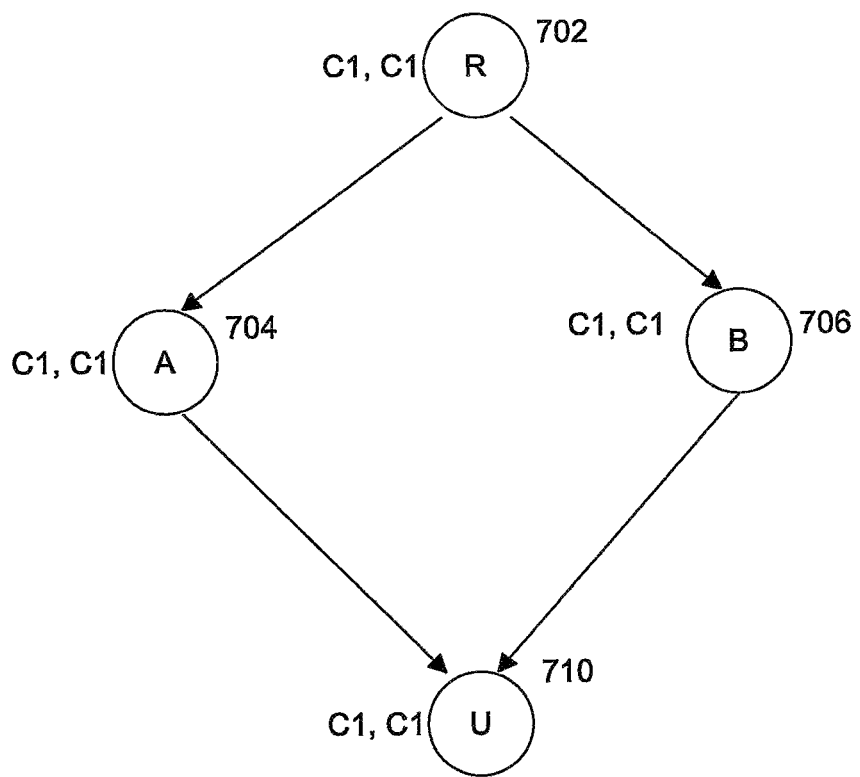
FIG. 7 illustrates an example diagram of a completion counter assignment according to an embodiment.

On the other hand, vertices can share completion counters if all of them have the same set of successor vertices. The reason is that the successor vertices can be triggered only after all the parent vertices operations have been completed. Therefore, the same completion counter can be used for all the vertices having the same set of successor vertices. In this case, the successor vertex should be triggered when the completion counter value indicates that all the parent vertices operations are complete. FIG. 7 illustrates an example diagram 700 of a completion counter assignment according to an embodiment. In FIG. 7, vertices a 704 and b 706 have the same child vertex u 710. In this example, vertex u 710 should be triggered when the value of C1 is 3 (meaning that both vertex a 704 and vertex b 706 are complete).

If both vertices, u and v, have out-degree=0, vertices u and v can share the same completion counter. Having the same completion counter for the leaf vertices simplifies detecting the completion of the entire collective (represented by the DAG in software on host computing platform 101), since only one counter needs to be checked.

If vertices u and v have one common child vertex w and the completion counters of vertices u and v are not the same, then vertex w's trigger counter $C_w$ can be the completion counter of one of its parent vertices if $C_w$ is not used as the trigger counter elsewhere in the DAG (below it is explained how the present approach maintains a list of trigger counters that are already in use). This is because if $C_w$ is used as the trigger counter of another vertex x whose parent vertices are u or v and another vertex y, the completion of vertex u or vertex v can trigger vertex x even before vertex y completes, leading to an erroneous trigger of the execution. A similar scenario was shown in FIG. 5.

A method of improved assignment of completion counters is described below. Given the dependences among various operations in a collective are specified with a DAG, vertices can be identified that can share completion counters. For this, embodiments use a modified version of a Breadth First Search (BFS) process. The steps of the method for improved assignment of completion counters are as follows:

Step1: If the original DAG has multiple in-degree=0 ($r_1$, $r_2$, ..., $r_n$) vertices, insert a new root vertex r and add edges from vertex r to vertices $r_1, r_2, \ldots, r_n$. This is because BFS assumes the DAG has a single root vertex.

Step2: Start BFS from the root vertex r; during traversal identify the set of successor vertices S of each vertex u; find all the predecessor vertices P for all the vertices in the set of successor vertices S and check if the vertices in the set P−u have the set of successor vertices S as their only successor vertices. If so, all the operations in set of predecessor vertices P are capable of sharing the same completion counter. Otherwise, the vertices in the set of predecessor vertices P should use different completion counters. Once the completion counter for a vertex is decided, the vertex is marked as visited, so that vertex is not traversed again in another pass of the BFS traversal of the DAG.

After these two steps, all the vertices that can share completion counters are marked. Then, the following rules are used for assigning the completion counters.

Rule 1.1:

If all the vertices in the set of predecessor vertices P can share completion counters and all of them have at least one common parent vertex u, then all the vertices in the set of predecessor vertices P can use the completion counter of vertex u as their completion counters.

Rule 1.2:

If all the vertices in the set of predecessor vertices P can share completion counters but they do not have any common parent, if one of the vertices s in set of predecessor vertices P has a completion counter $C_u$ assigned that is not used as the trigger counter of any other vertex so far, then $C_u$ can be used as the completion counters of the vertices in P−{s}. If there is no vertex s in the set of predecessor vertices P with an assigned completion counter $C_u$ or there is no such $C_u$ that is not used as a trigger counter, use an available counter from the completion counters of the parent vertices of the vertices in the set of predecessor vertices P (a list of available completion counters is maintained for each vertex). If no counter from the parent vertices completion counters is available, initialize a new counter and share among the vertices in the set of predecessor vertices P.

Rule 1.3:

If a vertex u is not marked to share completion counter with any other vertices, vertex u can use an available counter from the completion counters of its parent vertices. If no such counter is available, use a new counter for vertex u.

A method of improved assignment of trigger counters is described below, using the following rules.

Rule 2.1:

If a vertex v has no predecessor (in-degree=0), vertex v uses a new counter as the trigger counter.

Rule 2.2:

If a vertex v has in-degree=1 (e.g., the number of predecessors=1), the completion counter of the predecessor vertex of (u) can be used as the trigger counter of vertex v.

Rule 2.3:

If a vertex v has in-degree >1 (number of predecessors >1), then

Rule 2.3.1:

If all the predecessors have the same completion counter $C_u$, then assign trigger counter of vertex v=$C_u$.

Rule 2.3.2:

If the completion counters of all the predecessor vertices are not the same, then vertex v can have the completion counter of the parent vertex (p) with out-degree=1 as vertex v's trigger counter, provided that vertex p's parents are also parents of the other parents of vertex v; otherwise, the trigger counter of vertex v will be the available counter Cq of the parent vertex q such that Cq is not being used as an active trigger counter by any other vertex in the DAG; otherwise allocate a new counter.

Figure 8:
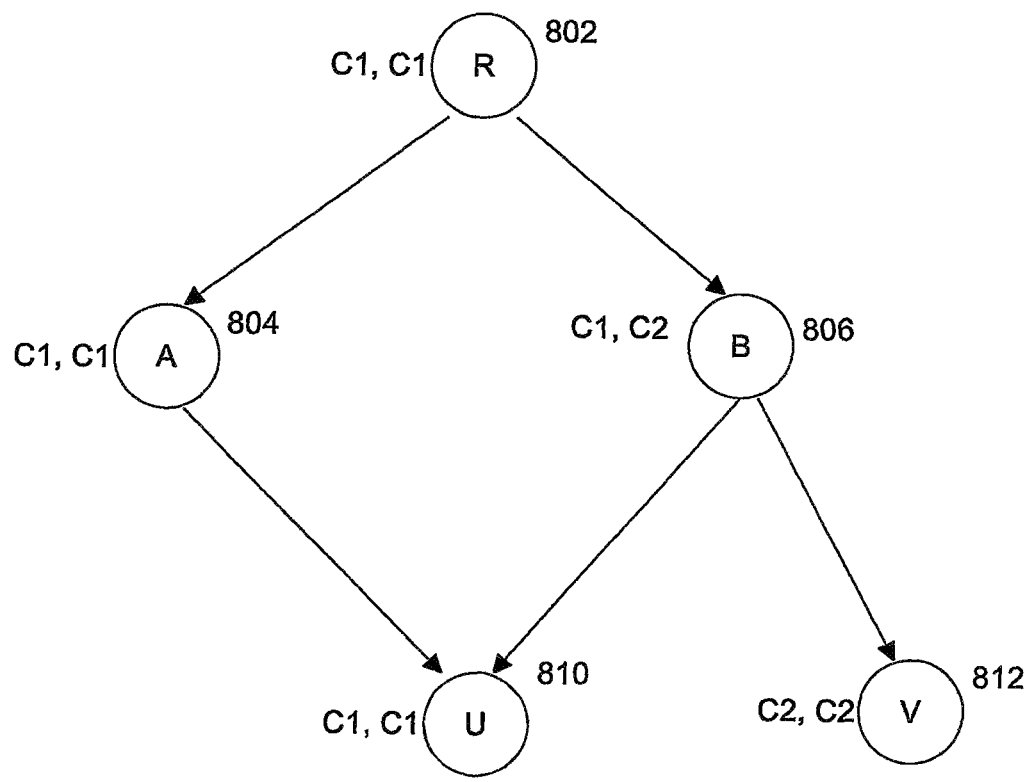
FIG. 8 illustrates an example diagram of a trigger counter assignment according to an embodiment.
Figure 9:
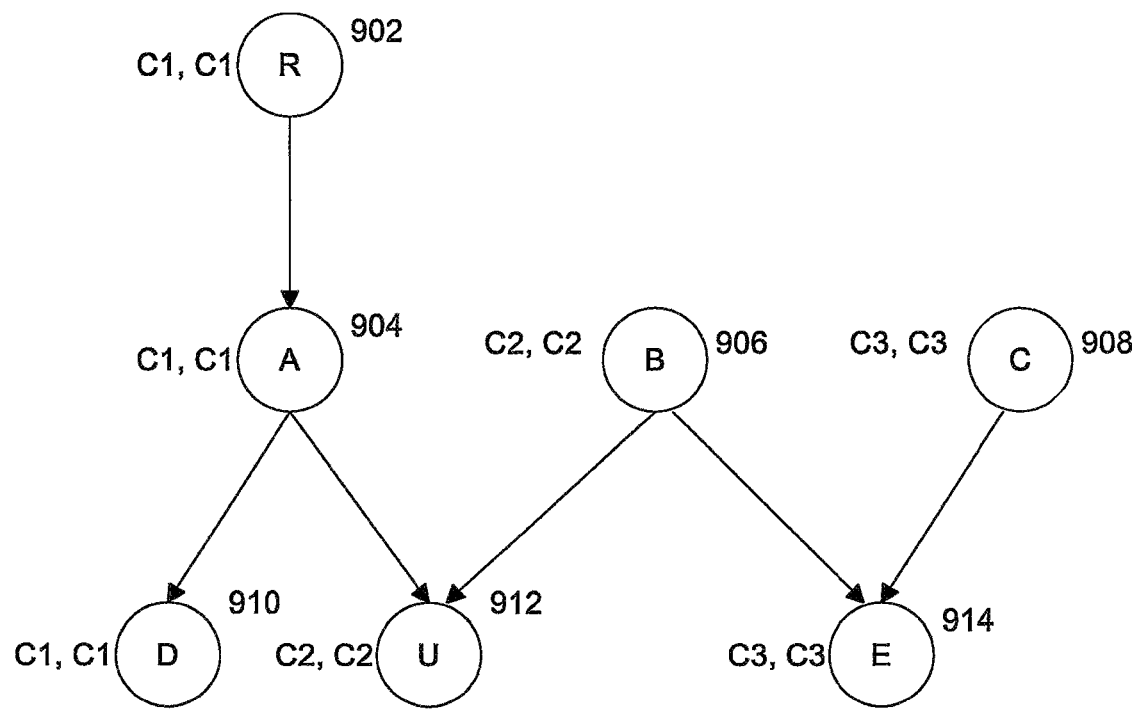
FIG. 9 illustrates an example diagram of a trigger counter assignment according to an embodiment.

FIG. 8 illustrates an example diagram 800 of a trigger counter assignment according to an embodiment. As depicted in FIG. 8, vertex U 810 which has in-degree=2 has two parents A 804 and B 806 and U 810 is the only child of vertex A 804. The parent of vertex A 804 (e.g., vertex R 802) is also a parent of vertex B 906. As a result, vertex U 810 can use the completion counter of vertex A 804 as its trigger counter. On the other hand, in FIG. 9, the parents of vertex A 904 (e.g., vertex R 902) and vertex B 906 are different. As a result, vertex U 912 uses the available counter C2 of parent B 906 as its trigger counter (When vertex U 912 uses C2, C2 is not used as an active trigger counter anywhere else in the DAG, vertex B 806 is triggered automatically as vertex B does not have any parent).

The rules described herein assume that while assigning counters to a vertex v, counters have already been assigned to all its predecessors. As a result, in order to assign the trigger and completion counters according to the rules, embodiments use a topological traversal of the DAG that assigns the counters according to the linear ordering of the vertices. Thus, topological traversal ensures that when counters are assigned for a vertex v, all predecessors of vertex v have been assigned triggered and completion counters.

Figure 10:
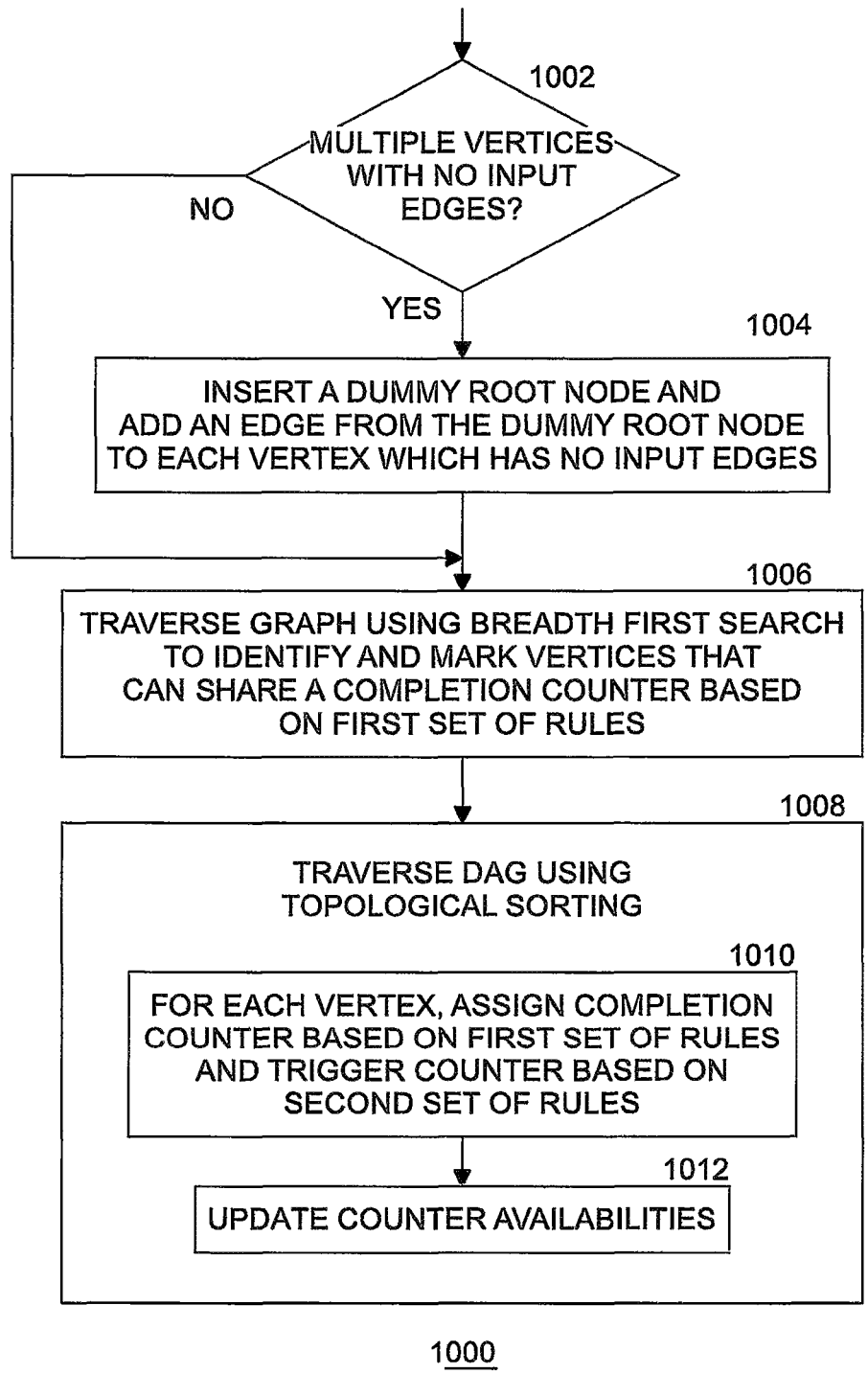
FIG. 10 illustrates a flow diagram of assigning counters according to an embodiment.

FIG. 10 illustrates a flow diagram of assigning counters according to an embodiment. In an embodiment, this method may be implemented in MPI library 161. At block 1002, if there are multiple vertices with in-degree=0 in the DAG (that is, no input edges), insert a dummy root and add an edge from the dummy root to each of the vertices with no input edges (in-degree=0) at block 1004. Processing then continues with block 1006. If there are not multiple vertices with no input edges (that is, there is a single root node for the DAG), then processing proceeds to block 1006. At block 1006, perform a breadth first search (BFS) of the DAG to traverse the DAG to identify and mark the vertices that can share a completion counter based at least in part n application of Rules 1.1, 1.2, and 1.3. In an embodiment, marking vertices includes storing indicators in the vertices in the DAG. At block 1008, traverse the DAG using topological sorting. In computer science, a topological sort or topological ordering of a directed graph is a linear ordering of its vertices such that for every directed edge uv from vertex u to vertex v, vertex u comes before vertex v in the ordering. As part of block 1008, for each vertex, at block 1010 assign a completion counter based at least in part on Rules 1.1, 1.2, and 1.3, and assign a trigger counter based at least in part on Rules 2.1, 2.2, and 2.3 described above, and availabilities of the counters. In addition, as part of block 1008, at block 1012 update counter availabilities.

In order to keep track of the available counters at block 1012, in an embodiment two types of lists are maintained. Each vertex has its own list LA of available counters. A vertex keeps its own completion counter along with any counter inherited from its parents in LA. A vertex inherits the available counters from all its parents. The counters in LA are available to be used by the children of that vertex. A global list $L_T$ of trigger counters is also maintained. The global list of trigger counters keeps track of the active trigger counters (counters that have been used as trigger counters by some vertex in the DAG so far). A counter is inserted into $L_T$ whenever it is used as a trigger counter. While assigning counters to a vertex v, the trigger counters of vertex v's parents can be removed from $L_T$ provided that vertex v is the last child of its parents in the topological ordering.

A comparison of the present method and a known Naïve approach is shown below.

The known Naïve approach of counter assignment assigns new trigger and completion counters to each vertex in the DAG. As a result, if the number of vertices in a DAG is N, the Naïve approach requires 2N counters. A straight-forward optimization of the Naïve approach is to use the completion counter of the predecessor as the trigger counter for vertices with in-degree=1 and sharing completion counters among the vertices with out-degree=0. This approach can be called Naïve-enhanced. But for complex collectives like "Alltoall," there are a large number of vertices with in-degree >1. Therefore, the Naïve-enhanced approach cannot guarantee optimal usage of the counters. Embodiments of the present invention significantly reduce the number of counters over both Naïve and Naïve-enhanced.

Figure 11:
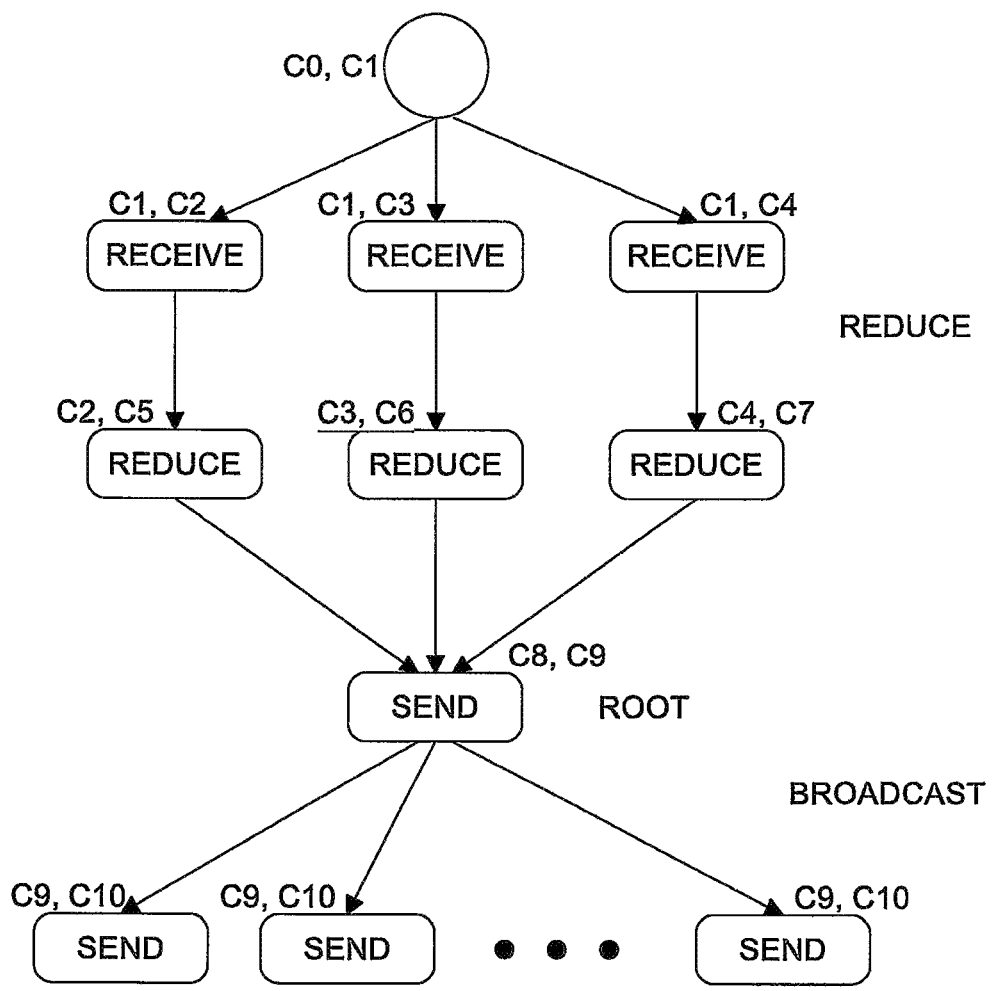
FIG. 11 illustrates an example counter assignment for a root node using a known naïve approach.
Figure 12:
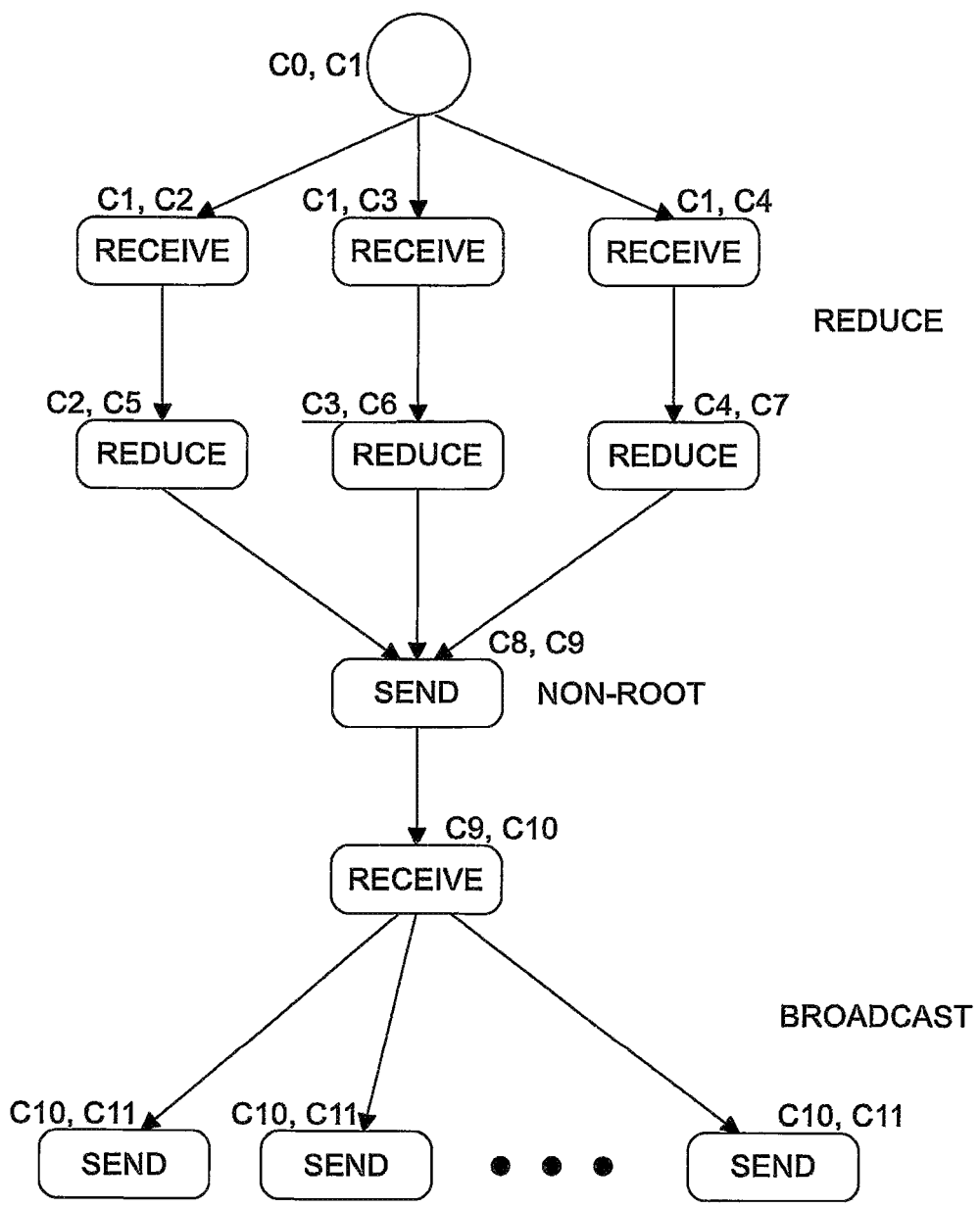
FIG. 12 illustrates an example counter assignment for a non-root node using a known naïve approach.
Figure 13:
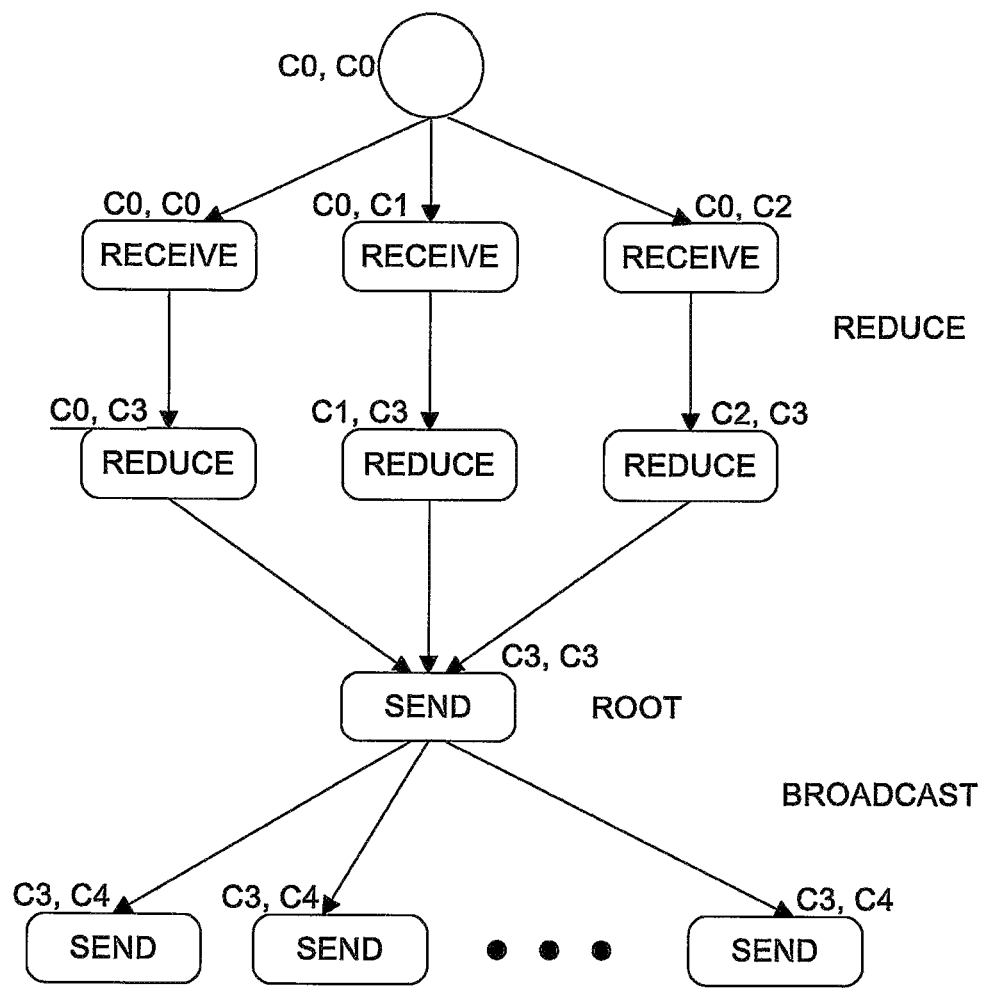
FIG. 13 illustrates an example counter assignment for a root node according to an embodiment.
Figure 14:
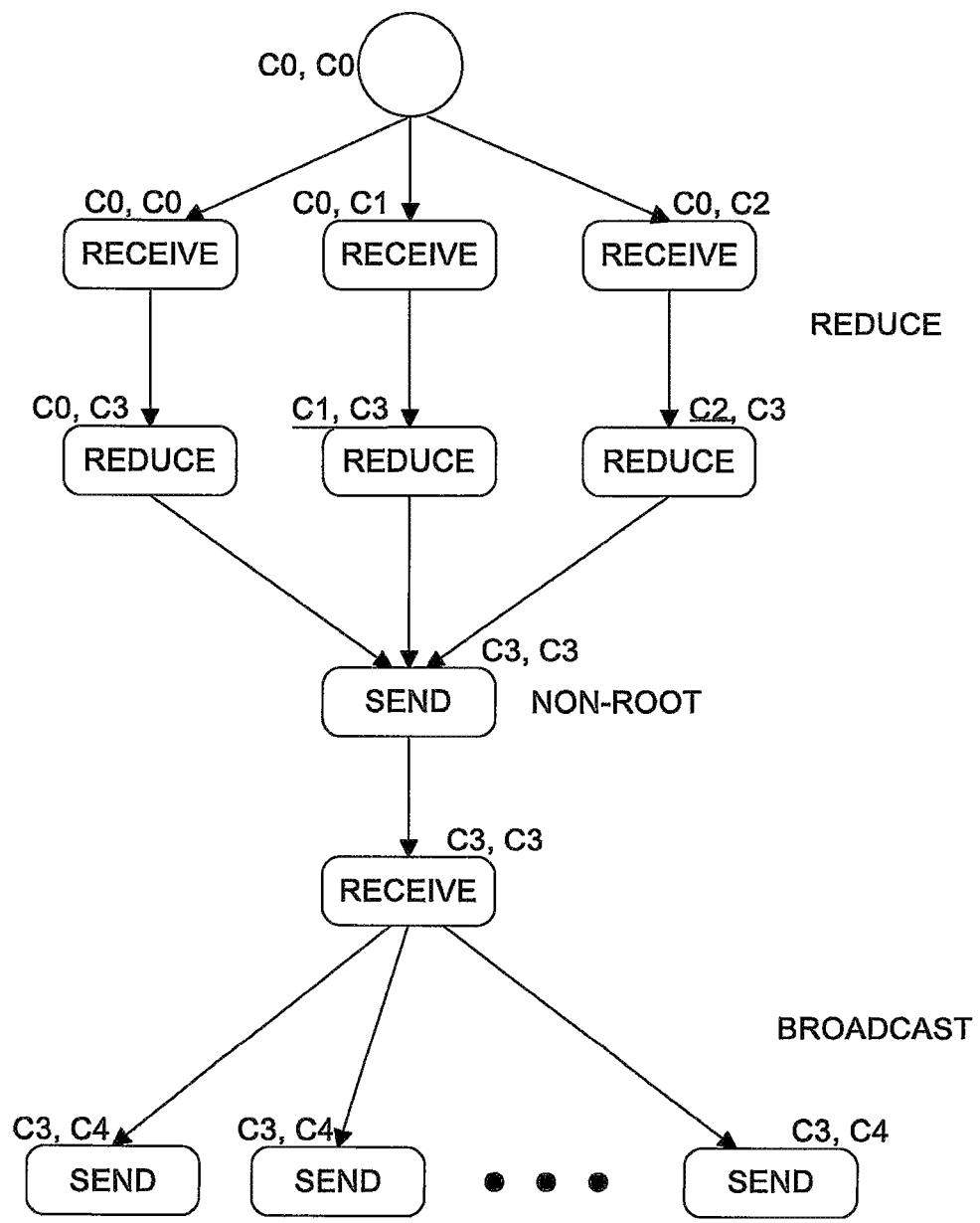
FIG. 14 illustrates an example counter assignment for a non-root node according to an embodiment.

FIG. 11 illustrates an example 1100 counter assignment for a tree-based "Allreduce" root node using a known Naïve approach. FIG. 12 illustrates an example 1200 counter assignment for a tree-based "Allreduce" non-root node using a known Naïve approach. FIG. 13 illustrates an example 1300 counter assignment for a root node according to an embodiment. FIG. 14 illustrates an example 1400 counter assignment for a non-root node according to an embodiment.

As observed from FIG. 11, for the Naïve-enhanced algorithm, two different counters are needed per vertex. The vertices with in-degree=1 use the completion counter of its parent as the trigger counter. The vertex with in-degree >1 does not re-use any of its parents completion counters as the trigger counter. Instead, the vertex intializes a new counter and adds one to the counter as each of the parent operation completes (the threshold is equal to the number of parents). The number of counters needed by this approach is 11 for the root rank and 12 for the non-root ranks. On the other hand, embodiments of the present invention need only 5 counters for the same DAGs. The reason for this significant reduction in the number of counters used is that the present method can share completion counters among vertices that have the same children (Reduce-1, Reduce-2, and Reduce-3) and re-use the completion counter from parents as the trigger counter (Send-1 by Rule 2.3.1).

The two approaches were applied to the DAGs for other collectives such as "Allreduce" with recursive doubling, tripling, "Alltoall," etc. Table 1 shows the comparisons of the present method with the Naïve-enhanced approach.

TABLE 1

| Collective | Number of counters required by Naïve-enhanced approach | Number of counters required by present method |
|---|---|---|
| Allreduce with Recursive Doubling (single buffer, commutative) | 18 (3 phases) | 3 (irrespective of the number of phases) |
| Allreduce with Recursive Tripling (receive buffer per phase) | 29 (3 phases) | 8 (3 phases) |
| Alltoall Brucks radix 3 (reuse buffers across phases) | 33 (3 phases) | 5 (irrespective of the number of phases) |

Figure 15:
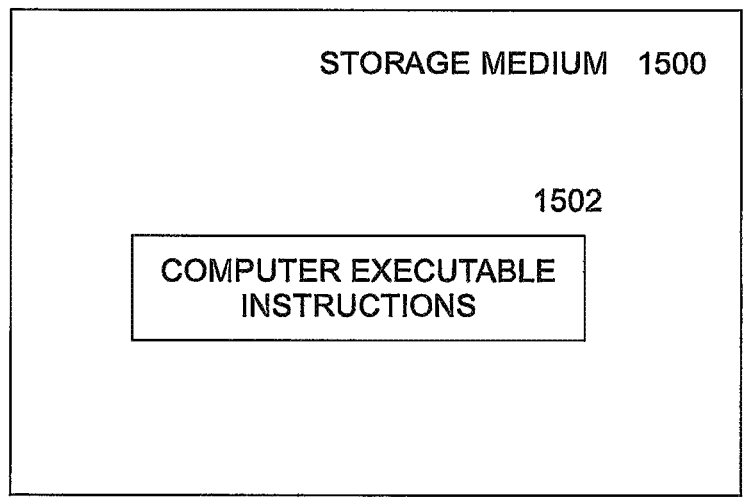
FIG. 15 illustrates an example of a storage medium.

FIG. 15 illustrates an example of a storage medium 1500. Storage medium 1500 may comprise an article of manufacture. In some examples, storage medium 1500 may include any non-transitory computer readable medium or machine readable medium, such as an optical, magnetic or semiconductor storage. Storage medium 1500 may store various types of computer executable instructions, such as instructions 1502 to implement logic flows described above in FIG. 10 and Rules 1.1, 1.2, 1.3, 2.1, 2.2, and 2.3. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 16:
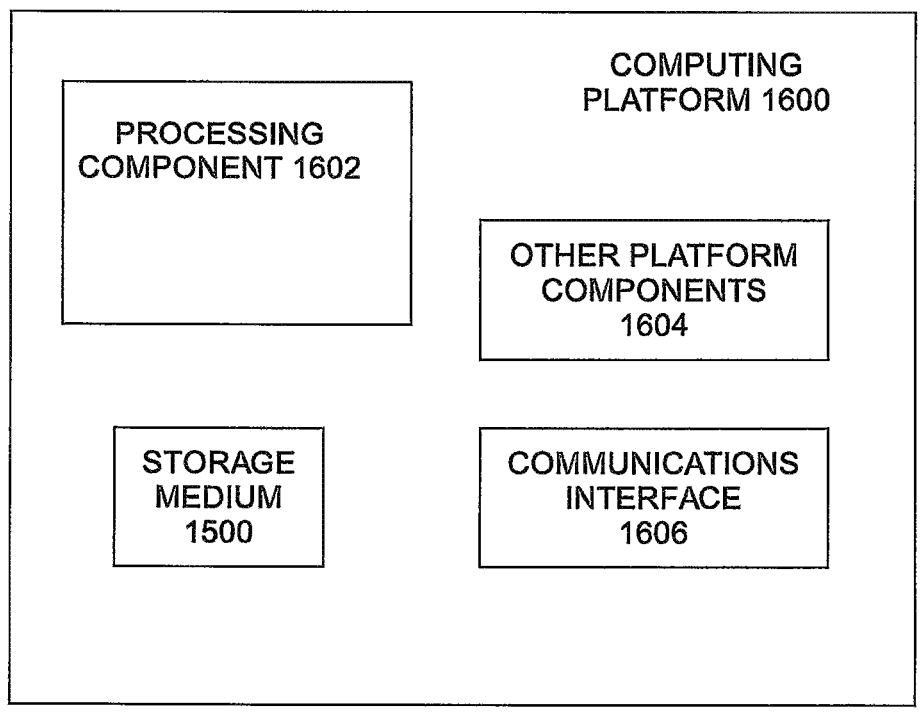
FIG. 16 illustrates another example computing platform.

FIG. 16 illustrates an example computing platform 1600. In some examples, as shown in FIG. 16, computing platform 1600 may include a processing component 1602, other platform components 1604 and/or a communications interface 1606.

According to some examples, processing component 1602 may execute processing operations or logic for instructions stored on storage medium 1500. Processing component 1602 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 1604 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), types of non-volatile memory such as 3-D cross-point memory that may be byte or block addressable. Non-volatile types of memory may also include other types of byte or block addressable non-volatile memory such as, but not limited to, multi-threshold level NAND flash memory, NOR flash memory, single or multi-level PCM, resistive memory, nanowire memory, FeTRAM, MRAM that incorporates memristor technology, STT-MRAM, or a combination of any of the above. Other types of computer readable and machine-readable storage media may also include magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 1606 may include logic and/or features to support a communication interface. For these examples, communications interface 1606 may include one or more communication interfaces that operate according to various communication protocols or standards to communicate over direct or network communication links or channels. Direct communications may occur via use of communication protocols or standards described in one or more industry standards (including progenies and variants) such as those associated with the peripheral component interconnect express (PCIe) specification. Network communications may occur via use of communication protocols or standards such those described in one or more Ethernet standards promulgated by the Institute of Electrical and Electronics Engineers (IEEE). For example, one such Ethernet standard may include IEEE 802.3. Network communication may also occur according to one or more OpenFlow specifications such as the OpenFlow Switch Specification.

The components and features of computing platform 1600, including logic represented by the instructions stored on storage medium 1500 may be implemented using any combination of discrete circuitry, ASICs, logic gates and/or single chip architectures. Further, the features of computing platform 1600 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 1600 shown in the block diagram of FIG. 16 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASIC, programmable logic devices (PLD), digital signal processors (DSP), FPGA, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Included herein are logic flows or schemes representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow or scheme may be implemented in software, firmware, and/or hardware. In software and firmware embodiments, a logic flow or scheme may be implemented by computer executable instructions stored on at least one non-transitory computer readable medium or machine readable medium, such as an optical, magnetic or semiconductor storage. The embodiments are not limited in this context.

Some examples are described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What is claimed is:

1. An apparatus comprising:
  an input/output (I/O) device including a plurality of counters, each counter operating as one of a completion counter and a trigger counter;
  a processing device; and
  a memory device coupled to the processing device, the memory device having instructions stored thereon that, in response to execution by the processing device, cause the processing device to:
  represent a plurality of triggered operations of collective communication for high-performance computing executable by the I/O device as a directed acyclic graph stored in the memory device, with triggered operations represented as vertices of the directed acyclic graph and dependencies between triggered operations represented as edges of the directed acyclic graph;
  traverse the directed acyclic graph using a first process to identify and mark vertices that can share a completion counter; and
  traverse the directed acyclic graph using a second process to assign a completion counter and a trigger counter for each vertex.

2. The apparatus of claim 1, the memory device having instructions stored thereon that, in response to execution by the processing device, cause the processing device to insert a root node and an edge from the root node to each vertex which has no input edges into the directed acyclic graph when multiple vertices of the directed acyclic graph have no input edges.

3. The apparatus of claim 1, wherein the first process is a breadth first search (BFS) process.

4. The apparatus of claim 1, wherein the second process is a topological sorting process.

5. The apparatus of claim 1, wherein instructions to identify and mark vertices that can share a completion counter comprise instructions to traverse the directed acyclic graph, and during traversal to identify a set of successor vertices S of each vertex u;
  identify a set of predecessor vertices P of each of the successor vertices S;
  when vertices in a set (P–u) have the set of successor vertices S as their only successor vertices, mark vertices in the set of predecessor vertices P as capable of sharing a completion counter;
  when vertices in a set (P–u) do not have the set of successor vertices S as their only successor vertices, mark vertices in the set of predecessor vertices P as not capable of sharing a completion counter; and
  mark vertex u as visited.

6. The apparatus of claim 5, wherein instructions to assign the completion counter comprise instructions to assign the completion counter by applying a first set of rules and based at least in part on the marked vertices, wherein the first set of rules comprises:
    if the vertices in the set of predecessor vertices P are capable of sharing completion counters and the vertices have at least one common parent vertex u, then the vertices in the set of predecessor vertices P are assigned the completion counter of vertex u as their completion counter.

7. The apparatus of claim 6, wherein the first set of rules comprises:
    if the vertices in the set of predecessor vertices P are capable of sharing completion counters but do not have any common parent vertex, and
        if one of the vertices s in the set of predecessor vertices P has an assigned completion counter $C_u$ that is not used as the trigger counter of any other vertex so far, assign completion counter $C_u$ as the completion counter for the vertices in the set P−{s};
        if there is no vertex s in the set of predecessor vertices P with an assigned completion counter $C_u$ or there is no such completion counter $C_u$ that is not used as a trigger counter, assign an available completion counter from the completion counters of the parent vertices of the vertices in the set of predecessor vertices P; and
        if no completion counter from the completion counters of the parent vertices is available, initialize a new completion counter and assign the new completion counter to the vertices in the set of predecessor vertices P.

8. The apparatus of claim 6, wherein the first set of rules comprises:
    if vertex u is not marked to share a completion counter with any other vertices, assign to vertex u an available completion counter from one of the completion counters of parent vertices of vertex u; and if no completion counter is available, assign a new completion counter to vertex u.

9. The apparatus of claim 1, wherein assigning the trigger counter comprises assigning the trigger counter by applying a second set of rules and based at least in part on the marked vertices, wherein the second set of rules comprises:
    if a vertex v has no predecessor vertex, assign a new counter to as the trigger counter of vertex v.

10. The apparatus of claim 9, wherein the second set of rules comprises:
    if vertex v has a number of predecessor vertices equal to one, assign the completion counter of the predecessor vertex of vertex u as the trigger counter of vertex v.

11. The apparatus of claim 9, wherein the second set of rules comprises:
    if vertex v has a number of predecessor vertices greater than one, then
        if all the predecessor vertices have the same completion counter $C_u$, assign the completion counter $C_u$ as the trigger counter of vertex v;
        if the completion counters of all the predecessor vertices are not the same, assign to vertex v the completion counter of the parent vertex (p) with out-degree=1 as the trigger counter of vertex v's, provided that vertex p's parents are also parents of the other parents of vertex v; otherwise, assign trigger counter of vertex v to be an available counter Cq of a parent vertex q such that Cq is not being used as an active trigger counter by any other vertex in the directed acyclic graph; otherwise allocate a new counter as the trigger counter of vertex v.

12. A method of operating a computing system comprising:
    representing a plurality of triggered operations of collective communication for high-performance computing executable by an I/O device as a directed acyclic graph stored in a memory device, with triggered operations represented as vertices of the directed acyclic graph and dependencies between triggered operations represented as edges of the directed acyclic graph;
    traversing the directed acyclic graph using a first process to identify and mark vertices that can share a completion counter; and
    traversing the directed acyclic graph using a second process to assign a completion counter and a trigger counter of the I/O device for each vertex.

13. The method of claim 12, comprising inserting a root node and an edge from the root node to each vertex which has no input edges into the directed acyclic graph when multiple vertices of the directed acyclic graph have no input edges.

14. The method of claim 12, wherein identifying and marking vertices that can share a completion counter comprise traversing the directed acyclic graph, and during traversal,
    identifying a set of successor vertices S of each vertex u;
    identifying a set of predecessor vertices P of each of the successor vertices S;
    when vertices in a set (P−u) have the set of successor vertices S as their only successor vertices, marking vertices in the set of predecessor vertices P as capable of sharing a completion counter;
    when vertices in a set (P−u) do not have the set of successor vertices S as their only successor vertices, marking vertices in the set of predecessor vertices P as not capable of sharing a completion counter; and
    marking vertex u as visited.

15. The method of claim 14, wherein assigning the completion counter comprises assigning the completion counter by applying a first set of rules and based at least in part on the marked vertices, wherein the first set of rules comprises:
    if the vertices in the set of predecessor vertices P are capable of sharing completion counters and the vertices have at least one common parent vertex u, then assigning the completion counter of vertex u to the vertices in the set of predecessor vertices P as their completion counter.

16. The method of claim 15, wherein the first set of rules comprises:
    if the vertices in the set of predecessor vertices P are capable of sharing completion counters but do not have any common parent vertex, and
        if one of the vertices s in the set of predecessor vertices P has an assigned completion counter $C_u$ that is not used as the trigger counter of any other vertex so far, assigning completion counter $C_u$ as the completion counter for the vertices in the set P−{s};
        if there is no vertex s in the set of predecessor vertices P with an assigned completion counter $C_u$ or there is no such completion counter $C_u$ that is not used as a trigger counter, assigning an available completion counter from the completion counters of the parent vertices of the vertices in the set of predecessor vertices P; and if no completion counter from the completion counters of the parent vertices is available, initializing a new completion counter and assign the new completion counter to the vertices in the set of predecessor vertices P.

17. The method of claim 15, wherein the first set of rules comprises:
if vertex u is not marked to share a completion counter with any other vertices, assigning to vertex u an available completion counter from one of the completion counters of parent vertices of vertex u; and if no completion counter is available, assigning a new completion counter to vertex u.

18. The method of claim 12, wherein assigning a trigger counter comprises assigning the trigger counter by applying a second set of rules and based at least in part on the marked vertices, wherein the second set of rules comprises:
if a vertex v has no predecessor vertex, assigning a new counter as the trigger counter of vertex v.

19. The method of claim 18, wherein the second set of rules comprises:
if vertex v has a number of predecessor vertices equal to one, assign the completion counter of the predecessor vertex of vertex u as the trigger counter of vertex v.

20. The method of claim 18, wherein the second set of rules comprises:
if vertex v has a number of predecessor vertices greater than one, then
if all the predecessor vertices have the same completion counter $C_u$, assigning the completion counter $C_u$ as the trigger counter of vertex v;
if the completion counters of all the predecessor vertices are not the same, assigning to vertex v the completion counter of the parent vertex (p) with out-degree=1 as the trigger counter of vertex v's, provided that vertex p's parents are also parents of the other parents of vertex v; otherwise, assigning trigger counter of vertex v to be an available counter Cq of a parent vertex q such that Cq is not being used as an active trigger counter by any other vertex in the directed acyclic graph; otherwise allocating a new counter as the trigger counter of vertex v.

21. At least one tangible machine-readable medium comprising a plurality of instructions that in response to being executed by a processor cause the processor to:
represent a plurality of triggered operations of collective communication for high-performance computing executable by an I/O device as a directed acyclic graph stored in a memory device, with triggered operations represented as vertices of the directed acyclic graph and dependencies between triggered operations represented as edges of the directed acyclic graph;
traverse the directed acyclic graph using a first process to identify and mark vertices that can share a completion counter; and
traverse the directed acyclic graph using a second process to assign a completion counter and a trigger counter for each vertex.

22. The at least one tangible machine-readable medium of claim 21, wherein instructions to identify and mark vertices that can share a completion counter comprises instructions to traverse the directed acyclic graph, and during traversal to
identify a set of successor vertices S of each vertex u;
identify a set of predecessor vertices P of each of the successor vertices S;
when vertices in a set (P−u) have the set of successor vertices S as their only successor vertices, mark vertices in the set of predecessor vertices P as capable of sharing a completion counter;
when vertices in a set (P−u) do not have the set of successor vertices S as their only successor vertices, mark vertices in the set of predecessor vertices P as not capable of sharing a completion counter; and
mark vertex u as visited.

23. The at least one tangible machine-readable medium of claim 22, wherein instructions to assign the completion counter comprise instructions to assign the completion counter by applying a first set of rules and based at least in part on the marked vertices, wherein the first set of rules comprises:
if the vertices in the set of predecessor vertices P are capable of sharing completion counters and the vertices have at least one common parent vertex u, then the vertices in the set of predecessor vertices P are assigned the completion counter of vertex u as their completion counter.

24. The at least one tangible machine-readable medium of claim 23, wherein the first set of rules comprises:
if the vertices in the set of predecessor vertices P are capable of sharing completion counters but do not have any common parent vertex, and
if one of the vertices s in the set of predecessor vertices P has an assigned completion counter $C_u$ that is not used as the trigger counter of any other vertex so far, assign completion counter $C_u$ as the completion counter for the vertices in the set P−{s};
if there is no vertex sin the set of predecessor vertices P with an assigned completion counter $C_u$ or there is no such completion counter $C_u$ that is not used as a trigger counter, assign an available completion counter from the completion counters of the parent vertices of the vertices in the set of predecessor vertices P; and
if no completion counter from the completion counters of the parent vertices is available, initialize a new completion counter and assign the new completion counter to the vertices in the set of predecessor vertices P.

25. The at least one tangible machine-readable medium of claim 23, wherein the first set of rules comprises:
if vertex u is not marked to share a completion counter with any other vertices, assign to vertex u an available completion counter from one of the completion counters of parent vertices of vertex u; and if no completion counter is available, assign a new completion counter to vertex u.

26. The at least one tangible machine-readable medium of claim 21, wherein instructions to assign the trigger counter comprise instructions to assign the trigger counter by applying a second set of rules and based at least in part on the marked vertices, wherein the second set of rules comprises:
if a vertex v has no predecessor vertex, assign a new counter to as the trigger counter of vertex v.

27. The at least one tangible machine-readable medium of claim 26, wherein the second set of rules comprises:
if vertex v has a number of predecessor vertices equal to one, assign the completion counter of the predecessor vertex of vertex u as the trigger counter of vertex v.

28. The at least one tangible machine-readable medium of claim 26, wherein the second set of rules comprises:
if vertex v has a number of predecessor vertices greater than one, then if all the predecessor vertices have the same completion counter $C_u$, assign the completion counter $C_u$ as the trigger counter of vertex v;

if the completion counters of all the predecessor vertices are not the same, assign to vertex v the completion counter of the parent vertex (p) with out-degree=1 as the trigger counter of vertex v's, provided that vertex p's parents are also parents of the other parents of vertex v; otherwise, assign trigger counter of vertex v to be an available counter Cq of a parent vertex q such that Cq is not being used as an active trigger counter by any other vertex in the directed acyclic graph; otherwise allocate a new counter as the trigger counter of vertex v.

\* \* \* \* \*

UNITED STATES PATENT AND TRADEMARK OFFICE
CERTIFICATE OF CORRECTION

| | |
|---|---|
| PATENT NO. | : 10,846,245 B2 |
| APPLICATION NO. | : 16/353759 |
| DATED | : November 24, 2020 |
| INVENTOR(S) | : Nusrat Islam et al. |

It is certified that error appears in the above-identified patent and that said Letters Patent is hereby corrected as shown below:

In the Specification

Column 1 add before the first paragraph:
STATEMENT OF GOVERNMENT RIGHTS
This invention was made with Government support under Agreement No. 8F-30005, awarded by DOE. The Government has certain rights in this invention.

Signed and Sealed this
Twentieth Day of December, 2022

Katherine Kelly Vidal
*Director of the United States Patent and Trademark Office*